INVENTORS
ERIK KRABBE
KENNETH W. WENDT

BY

ATTORNEY

United States Patent Office 3,123,475
Patented Mar. 3, 1964

3,123,475
SEQUENTIAL FERMENTATION PROCESS FOR THE PRODUCTION OF ALCOHOLIC CEREAL BEVERAGES
Kenneth W. Wendt, Brookfield, and Erik Krabbe, Whitefish Bay, Wis., assignors to Miller Brewing Company, Milwaukee, Wis., a corporation of Wisconsin
Filed Jan. 16, 1963, Ser. No. 251,918
7 Claims. (Cl. 99—31)

This invention relates to the production of a fermented cereal beverage such as beer, ale, stout, porter and the like; more particularly, this invention relates to improvements in the batchwise fermentation of a solution of fermentable sugars, hereinafter termed "wort."

The overall process of producing a fermented cereal beverage such as beer may be divided into three major stages. First, in the wort preparation stage, a solution of fermentable sugars is prepared by mashing malted barley, and an adjunct cereal if desired, in hot water to enzymatically convert the starches of the malt and adjunct into fermentable sugars. The wort resulting from mashing is separated from the insoluble grain residue and sterilized by boiling, during which time it is also flavored by the addition of hops or a hop extract. The hopped wort is next clarified by removing the spent hops and materials coagulated during boiling. The clarified wort it then cooled to about 50° F., after which it is often aerated with sterile air and then injected or "pitched" with yeast and sent to the second or fermentation stage of the process. In the fermentation stage, the yeasted wort is retained in one or more attemperated fermentation vessels, usually for a period of about one to two weeks, during which time the yeast ferments or breaks down the fermentable sugars of the wort into alcohol and carbon dioxide and the yeast population multiplies about three to six times. (Sometimes the yeasted wort is settled in "starting" or "settling" tanks for a short time before it is sent to the fermenting vessels to remove materials coagulated during cooling of the wort.) After the beer is fully attenuated it is cooled to enhance the precipitation of yeast. Then the beer is decanted from the precipitated yeast and sent to the third or aging stage of the process wherein the freshly fermented beer is aged at a low temperature for a period of several weeks to mellow its taste and aroma, during which stage any sediment remaining in the beer from the fermentation stage is generally removed. The beer may be carbonated before, during or after the aging period. After being suitably aged and carbonated, the beer is filtered and sent to the packaging operation.

It is to the second or fermentation stage of the brewing process as described above that the present invention relates. Almost all beer presently produced is fermented in a batchwise process wherein, after one batch of wort has been fermented in a fermentation vessel, the beer is drawn off and the vessel is opened and entered to push out the yeast remaining behind and to clean and prepare the vessel for the reception of a subsequent batch of wort. During the vigorous portion of the fermentation process the yeast is active and remains suspended or dispersed throughout the liquid in the fermentation vessel. However, as the fermentation nears completion, i.e. as the fermentable sugars become exhausted (generally more than 95% of the fermentable sugars in a wort is converted to alcohol and carbon dioxide during fermentation), the yeast cells tend to flocculate and precipitate to form a sediment layer along the bottom of the tank (where bottom-fermentation is used). This settling tendency is usually enhanced by cooling the liquid in the fermenting vessels down to about 40° F. or less after fermentation is completed. In a typical fermentation process, the temperature of the beer is usually maintained in the range of 50 to 60° F. and the fermentation of the sugars in the wort is completed in about five to nine days. By the end of this period approximately 40 to 60% of the total yeast population has settled to the bottom of the vessel. After this active fermentation period is finished, several (3 to 6) additional days are normally allowed to cooling and further yeast sedimentation and at the end of this portion of the process usually 80 to 95% of the total yeast population has accumulated on the floor of the vessel. The freshly fermented beer is then removed from the fermenting vessel and sent to the aging stage during which any yeast carried from the fermenting vessel is removed. Once the beer has been removed from the fermenting vessel, the vessel is vented to expel the carbon dioxide evolved during fermentation and men are sent into the vessel to push out the yeast into a suitable yeast collection system and then clean the vessel to remove as much of the accumulated residue as possible. The removal of the yeast is normally accomplished by pushing the settled yeast with a long handled squeegee toward the tank outlet from which it can be transferred using a gear pump to any desired location. The cleaning, which is begun only after all of the yeast has been manually removed, may be accomplished either manually using long handled brushes or hydraulically with a portable or an "in place" (permanently installed) spray system in combination with a pump for recirculating a cleaning solution. The carbon dioxide venting period can take about one or two days before it is safe for a man to enter the tank unless a forced ventilation system is used, in which event the venting can be done in an hour or so. This cleaning process, involving venting, entry of the tank for yeast removal and then cleaning the tank, must be performed on each fermentation tank after each batch of wort has been fermented. When it is realized that a modern large brewery may include several hundreds of fermenting vessels the magnitude of this cleaning problem can be appreciated.

The principal object of this invention is to provide an improved method for the batchwise fermentation of a wort solution into an alcoholic cereal beverage. Another main object of this invention is to provide an improved method for batchwise fermentation for the production of cereal alcoholic beverages which will eliminate many of the cumbersome and time-consuming cleaning operations now involved in the generally practiced batch fermentation methods. Still another object of this invention is to provide a batchwise fermentation method wherein the need for opening and entering a fermentation vessel after one batch of wort has been fermented in order to prepare the vessel for reception of a subsequent batch of wort is eliminated. A further object of this invention is to provide a fermentation process wherein fermentation is carried out in an atmosphere which will permit the process to take place under highly desirable biological conditions and which will also provide for effective cleansing of each vessel after the beer is removed therefrom. These and other more specific objects will become apparent from the ensuing description.

By way of summary, this invention provides a process for the batchwise fermentation of wort into an alcoholic beverage wherein a carbon dioxide atmosphere is maintained in a fermentation vessel as the sequence of steps including filling the vessel with wort, fermenting the wort, withdrawing the beer from the vessel and cleaning the vessel to prepare it for the reception of a subsequent batch of wort is carried out.

For a more detailed description, reference is made to the accompanying drawings which form a part hereof and in which there are shown, by way of illustration, several specific forms of apparatus suitable for the practice of this invention; in the drawings, like reference characters designate the same or similar parts in the various views. Each apparatus will be described in sufficient detail to enable those skilled in the art to practice this invention but it is to be understood that other forms of apparatus may be used and that structural changes in the apparatus described herein may be made by those skilled in the art without departing from the true scope of the present invention. The scope of the present invention is best defined by the appended claims and limitations set out in the following detailed description are not to be taken in a limiting sense except insofar as they are incorporated in the claims.

Figure 1:
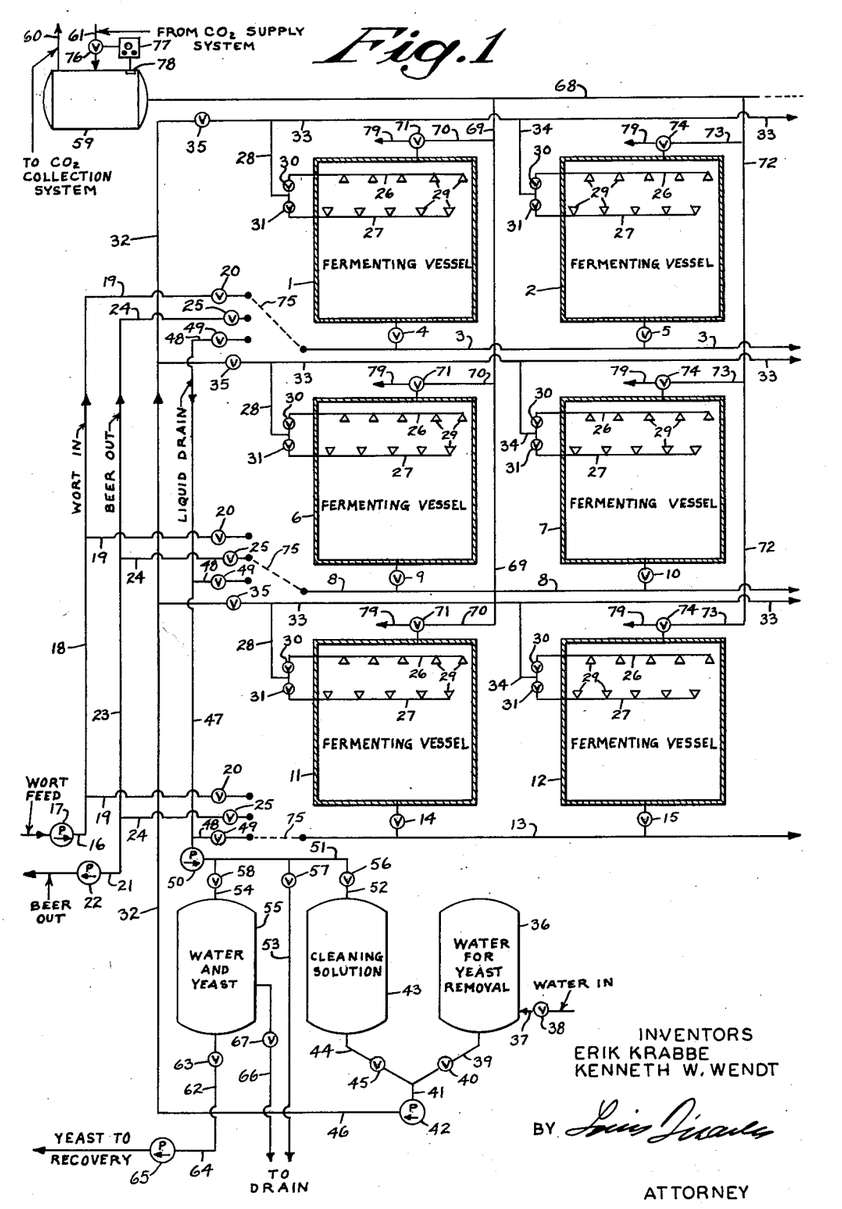
FIG. 1 is a schematic drawing showing a plurality of fermenting vessels arranged in a manner suitable for the practice of this invention.

FIG. 1 diagrammatically illustrates a plurality of fermenting vessels interconnected with piping, valves and associated equipment in a manner which will enable the practice of this invention. FIG. 1 is intended to depict the application of this invention to a series of closed rectangular fermenting vessels arranged in horizontal rows, with each row having several vessels, such as may be found in a brewery that has a large number of fermenting vessels housed in a multi-story building; thus, certain pipes are drawn to indicate that they may extend to other vessels, not shown, in the arrangement. Each fermenting vessel should normally include attemperating means, such as attemperating coils or jacket carrying a liquid coolant, such as propylene glycol, brine or ice water, to permit control of the temperature during fermentation in each vessel. Suitable attemperating means are well-known to brewery engineers and they have therefore been omitted from FIG. 1. The apparatus of FIG. 1 will be described in detail first in order to facilitate the explanation of the method of this invention. The following description will illustrate the present invention with reference to bottom-fermentation which uses a yeast that settles to the bottom of the fermentation vessel near and after the end of fermentation; however, the present invention is also applicable to top-fermentation which utilizes a yeast that rises to the top of the vessel near and after the end of fermentation.

The fermenting vessels 1 and 2 of the top row of FIG. 1 are each connected to a row transfer line 3 through valves 4 and 5 respectively; the fermenting vessels 6 and 7 in the middle row are connected to a row transfer line 8 through valves 9 and 10 respectively; and the fermenting vessels 11 and 12 in the lower row are each connected to a row transfer line 13 through valves 14 and 15 respectively. The arrows on the right ends of row transfer lines are used to indicate that each line may extend to other vessels that may be included in each horizontal row. Each row transfer line is to act as the major channel for the flow of liquids into and out of the fermentation vessels which it serves.

A wort feed line 16, which may include a pump 17, is connected to a vertical header 18 and three branch feed lines 19, each terminating at one of their ends in a valve 20, are attached to the header 18 with one branch feed line 19 serving each horizontal row of fermenting vessels so that wort may be supplied to any desired row. A beer output line 21, which may also include a pump 22, is connected with a vertical header 23; branch output lines 24, each terminating at one end in a valve 25 extend from the header 23, there being one such branch output line for each row of fermenting vessels to permit the flow of beer from the fermenting vessels into the output line 21.

A spray assembly comprising a manifold carrying a plurality of spray nozzles is arranged inside each fermenting vessel. The manifold is located near the top of each vessel and each manifold is shown in FIG. 1 as consisting of an upper branch 26 and a lower branch 27, with spray nozzles 29 disposed about each branch. Valves 30 and 31 are arranged to control the flow of liquids through upper branch 26 and lower branch 27 respectively. Each of the manifolds for the spray assemblies in fermenting vessels 1, 6 and 11 is connected to a short line 28 and each line 28, in turn, communicates with a horizontal header 33, there being one such horizontal header 33 for each row of fermenting vessels. As indicated by the arrows on their right ends, each horizontal header 33 may extend to other vessels in each row. Each horizontal header 33 communicates with a vertical riser 32 (at its lefthand end in FIG. 1). Each of the manifolds for the spray assemblies in fermenting vessels 2, 7 and 12 is attached to a short line 34 and each line 34 communicates with the horizontal header 33 for its particular row. A valve 35 is positioned as indicated to control fluid flow from the riser 32 into each header 33.

A water tank 36, supplied with water by a supply line 37 and its associated valve 38, is connected through line 39 and valve 40 to a short pipe 41 leading to the suction side of a pump 42. A cleaning solution tank 43 is connected to the pipe 41 through a line 44 and valve 45. The pressure side of the pump 42 communicates with a horizontal transfer line 46 and the latter communicates with the lower end of vertical riser 32. This system of pipes and valves is thus arranged so that either cleaning solution from tank 43 or water from tank 36 can be pumped through the spray assemblies located in each fermenting vessel.

A liquid drain line 47 extends upwardly across all the rows of fermenting vessels and at each level a branch drain line 48 extends from the drain line 47 to a valve 49, so that each row of fermenting vessels can be connected to the drain line as desired. The lower end of the drain line 47 leads to the suction side of a pump 50 and a line 51 extends from the pressure side of the pump 50. Line 52 connects the cleaning solution tank 43 to line 51, drain extension line 53 is connected to line 51, and line 54 connects a water and yeast tank 55 to line 51. Valves 56, 57 and 58 are arranged as indicated so that materials from the liquid drain line 47 can be passed through line 51 and sent to either the cleaning solution tank 43, the drain extension line 53 or the water and yeast tank 55, in a selective manner. A line 62, having a valve 63, extends from the bottom of the yeast tank 55 to a yeast recovery line 64 which has a pump 65 so that the yeast may be removed from the yeast tank and delivered to other stations, not shown, for recovery and further processing. A drain line 66 also extends from near the base of the yeast tank so that water and/or yeast may be delivered from the yeast tank to drain upon actuation of valve 67.

A carbon dioxide collection and supply line 68 extends across the top of the rows of fermenting vessels as shown in the drawing. One end of the line 68 leads to a surge tank 59 which has an outlet line 60 leading to a carbon dioxide collection system and an inlet line 61 leading from a carbon dioxide supply system. The inlet line 61 includes a valve 76 which is controlled by a pressure regulator 77 having a sensing element 78 located inside the surge tank 59. The carbon dioxide collection and supply systems are not shown in the drawings but preferably they comprise a system such as that shown in United States Letters Patent No. 2,862,819 to Hougen and Lydersen, wherein carbon dioxide evolved during fermentation is collected and purified, which purified carbon dioxide can then be used as a supply source; however, there are other forms of carbon dioxide collection and supply systems which can also be used. Since carbon dioxide is evolved during a fermentation process of the type to which this invention relates, the carbon dioxide system should preferably be adaptable to recover this carbon dioxide, although this is an optional feature. One end of the line 68 is dotted to indicate that it may extend across such other columns of fermenting vessels as may be included in the arrangement. A vertical carbon dioxide line 69 extends downwardly from the carbon dioxide line 68 as indicated and carries a number of carbon dioxide branch lines 70. There is one carbon dioxide branch line 70 for each fermenting vessel 1, 6 and 11 and each line 70 extends from the vertical carbon dioxide line 69 and communicates with the interior of its respective fermenting vessel through a valve 71 at the top of each vessel. A similar vertical carbon dioxide line 72 extends downwardly from the carbon dioxide line 68 and has a number of carbon dioxide branch lines 73; there being one branch line 73 for each of the fermenting vessels 2, 7 and 12; each branch line 73 communicates with the interior of its respective vessel through a valve 74. This carbon dioxide piping system is thusly adapted to provide and maintain a carbon dioxide atmosphere in each fermenting vessel and the surge tank 59 acts as a reservoir for the exchange of carbon dioxide from one vessel to another during filling and emptying of individual vessels, as will be more fully explained hereinafter. The surge tank also permits the use of a centralized pressure regulation system as indicated so that the pressure of the carbon dioxide atmosphere in the system can be readily controlled.

Each row transfer line 3, 8 and 13 has a movable end pipe 75 which is shown in FIG. 1 as a dotted line at the left-hand of each row transfer line. The purpose of the movable end pipe 75 is to permit selective attachment of the row transfer lines to either valves 20, 25 or 49 and thereby allow the various lines leading to these valves to be connected to the rows of fermenting vessels. Thus row transfer line 3 is shown connected to valve 20, row transfer line 8 is shown connected to valve 25, and row transfer line 13 is shown connected to valve 49, each transfer line being so connected through its respective movable end pipe 75. The movable end pipe 75 may comprise the well-known U-shaped pipe that is often used in the brewing industry for this type of use. If desired, however, each of the valves 20, 25 and 49 may lead to a short header and each row transfer line can be connected to the same header to permit control of liquid flow to and from the rows of fermenting vessels through these valves. Other suitable arrangements for this selective connection of the various lines will be apparent to those skilled in the art.

The method of this invention will now be described in detail with reference to the apparatus of FIG. 1. During the fermentation process, a sequence of steps is carried out in each fermentation vessel: the fermentation vessel is filled with a batch of yeasted wort; the wort is allowed to ferment to form beer; beer is removed from the vessel after fermentation is completed; any yeast left behind is then removed from the vessel; and, lastly, the vessel is cleaned and made ready for the reception of another batch of wort. In accordance with this invention, this entire sequence of steps is performed while a carbon dioxide atmosphere is maintained in each fermentation vessel, thereby permitting fermentation to proceed under highly desirable biological conditions and eliminating the need for opening and/or entering the vessel after each batch of wort has been fermented.

After a group of fermentation vessels has been joined together as shown in FIG. 1, each vessel is emptied of air. This may be accomplished by any of several methods. One workable manner of doing this is to volumetrically displace the air from the fermentation vessel with a liquid, such as by filling the vessel with water or wort in order to displace the contained air. Another method is to feed carbon dioxide into the vessel from the bottom and gradually purge the air out of the vessel by allowing the more dense carbon dioxide to displace the lighter air from the vessel; in this method the flow rate and pressure of the carbon dioxide as it is admitted into the vessel must be carefully controlled in order to effectively remove the air. Still another method is to fill a vessel with wort and allow the fermentation to proceed with air above the liquid level of the wort in the fermentation vessel and then, as carbon dioxide is evolved during fermentation, the carbon dioxide air mixture may be vented from the tank and periodically analyzed to ascertain when it is free of air, thereby indicating that there is no longer any air in the vessel above the wort layer. When this point has been reached, the carbon dioxide vent can be closed off and the carbon dioxide atmosphere maintained above the wort as is described in detail hereinafter. When the latter method is used, only the first batch of wort pumped into a fermentation vessel need be fermented in this manner and once the carbon dioxide atmosphere has been initially established it can be maintained throughout the remainder of the process and when fermenting subsequent batches of wort. These methods are exemplary only and other suitable means may be found to remove the contained air from the fermentation vessels. A vent 79 leads from each valve 71 and 74 so that air or a mixture of air and carbon dioxide, depending on which of the foregoing methods is used, can be expelled from each fermenting vessel; if desired, each vent 79 can lead to an exhaust manifold, not shown, for the discharge of the expelled gases. Valves 71 and 74 should be three-way valves so that they may be positioned to alternately permit gases to be expelled from the vessel through vent 79 or permit carbon dioxide to enter and leave the vessel through lines 70 or 73 respectively. Other pipes, valves and equipment for removing the contained gases from the fermentation vessels are not illustrated in the drawings as suitable items will be readily apparent to those skilled in the brewing art.

Referring now specifically to fermentation vessel 1, after the vessel has been emptied of its air all valves leading to the vessel are closed and valve 71 is opened so that carbon dioxide is fed into the vessel from the carbon dioxide supply system into surge tank 59, thence through the carbon dioxide collection and supply line 68, vertical carbon dioxide line 69 and branch line 70 in sufficient amount to provide a carbon dioxide atmosphere inside the vessel at a positive gauge pressure. A carbon dioxide pressure in the vessel of about 0.1 to 10.0 p.s.i.g. will be suitable in most instances, which pressure is controlled by the pressure regulator 77. In this fashion, the carbon dioxide atmosphere in the vessel can be maintained or controlled at any pre-selected pressure.

After a carbon dioxide atmosphere has been established in the vessel as described below, the steps described in the following numbered paragraphs are carried out in the vessel while this atmosphere is maintained therein.

Figure 2:
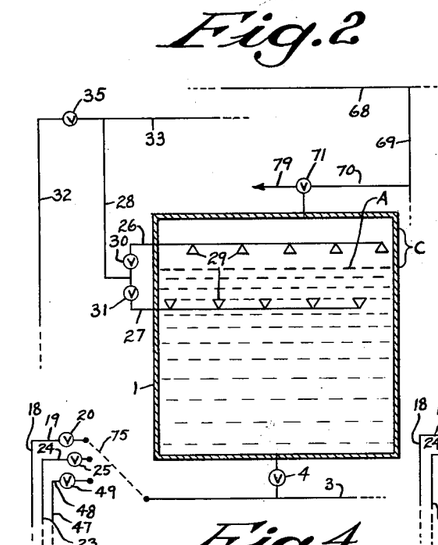
FIGS. 2 through 5 are schematic drawings of one of the fermenting vessels illustrated in FIG. 1 showing it during successive stages of the fermentation process.

(1) The vessel is filled with yeasted wort by connecting movable end pipe 75 on the end of row transfer line 3 to valve 20, opening valves 20 and 4 while keeping all other valves closed (except valve 71 which is kept open to allow the carbon dioxide that is displaced by the incoming yeasted wort to flow past the valve and through lines 70, 69 and 68 into the carbon dioxide collection and supply system) and actuating pump 17 to pump yeasted wort from the wort line 16 into vessel 1. After being filled with yeasted wort, the flow of wort to vessel 1 is cut off by closing valve 4 and the yeasted wort is allowed to ferment. It is preferable that the fermenting vessel be not quite completely filled with wort, so that a slight head space is provided at the top of the vessel to allow for build-up of foam. The spray assembly in the vessels can be partially or completely submerged in wort as desired. The carbon dioxide evolved in fermentation is allowed to escape past valve 71 and through lines 70, 69 and 68 into the carbon dioxide recovery system; if desired, this evolved carbon dioxide can also be vented to the atmosphere although it is preferable to collect it and use it in other vessels or for any other desired uses. At this stage, the vessel 1 is in the condition shown in FIG. 2 wherein it is illustrated as being filled with yeasted wort up to the level A, valve 71 is open to the carbon dioxide collection and supply line to permit removal of the evolved carbon dioxide while, at the same time, maintaining the carbon dioxide atmosphere in the vessel at a pre-selected positive pressure and valve 4 and all other valves are closed to prevent liquid flow into and out of the vessel.

Figure 3:
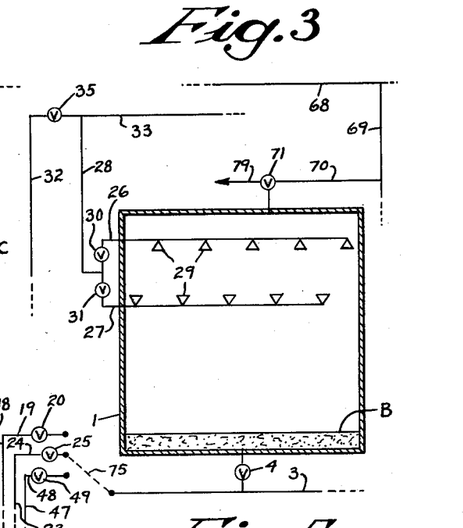
Figure 4:
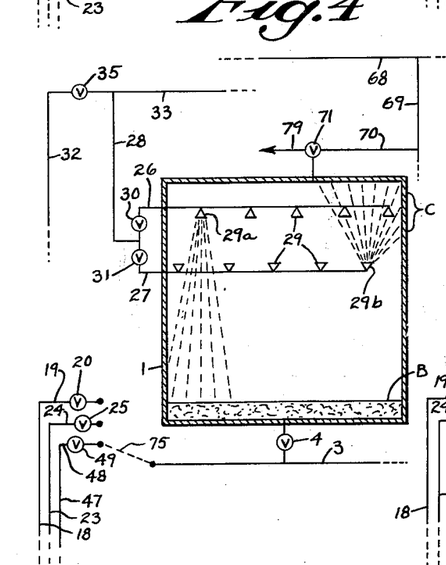

(2) Upon completion of fermentation of the batch of wort, which usually takes about five to nine days, the freshly fermented beer is withdrawn from fermentation vessel 1. If desired the beer may be cooled in the vessel for several days to settle more yeast before withdrawing. However, removing the beer from the fermenting vessel and then cooling the beer in an external heat exchanger followed by yeast removal by centrifugation is more efficient and allows for better utilization of fermenting tank capacity. The term "freshly fermented beer" or "freshly fermented alcoholic beverage" as used throughout this description and in the claims refers to beer or beverage as it is produced in the fermenting vessel upon completion of fermentation but before it is aged; thus, freshly fermented beer is non-aged beer. Withdrawal is accomplished by shifting movable end pipe 75 to valve 25, opening valves 4 and 25 while retaining the other valves closed (except valve 71) and actuating pump 22 to transfer the freshly fermented beer from the vessel through line 24 and header 23 into the beer output line 21. Prior to this withdrawal, the contents of the vessel may be cooled and the majority of the yeast suspended in the beer allowed to settle to form a layer at the bottom of the vessel. Although this invention may be practiced without allowing the yeast to settle before withdrawal of the beer, as will be more fully discussed hereinafter, this settling condition is illustrated in FIGS. 3 and 4. After removal of the freshly fermented beer, the fermentation vessel 1 is as shown in FIG. 3 wherein the yeast is illustrated as forming a soft paste-like layer with its level at B. At this stage all valves are closed except valve 71. The freshly fermented beer that was withdrawn from the vessel is pumped to an aging system, not shown, where it may be permited to age and mellow according to known techniques. As the beer is withdrawn from the vessel, carbon dioxide is allowed to flow into the vessel from the surge tank 59 and through the carbon dioxide collection and supply line 68, lines 69 and 70 and past valve 71 to replace the volume of the leaving beer. We prefer that the freshly fermented beer be passed through a centrifuge to remove as much of the yeast suspended in it before it is aged but the removal of suspended yeast from the beer can also be accomplished by other methods.

(3) After the beer has been removed from the vessel, the next step is to remove the yeast layer left behind in the vessel. To accomplish this, the movable end pipe 75 on the end of row transfer line 3 is disconnected from valve 25 and connected to valve 49, as shown in FIG. 4, so that the row transfer line will be connected to the liquid drain line 47 through branch line 48. Referring back to FIG. 1, the valve 45 in line 44 leading from the base of cleaning solution tank 43 to the pump 42 is closed and the valve 40 in the line 39 leading from the base of the water tank 36 to the pump 42 is opened so that water can be pumped from the water tank 36 through horizontal transfer line 46 and into the vertical riser 32. Valves 30 and 31 on the upper branch 26 and lower branch 27 of the spray assembly manifold in the top of the vessel and valve 35 are opened as necessary so that the water may flow from the vertical riser 32 through the horizontal header 33 and each branch of the spray assembly and thence through the spray nozzles 29 disposed thereabout. The spray nozzles are arranged so that they will distribute the water about the vessel 1 in a manner which will provide for removal of the yeast. Since most of the yeast is contained in a layer formed at the base of the vessel, some of the nozzles should be arranged so that their spray will be directed downwardly in order to impinge on the yeast layer. To this end, the spray nozzles 29 located on the upper branch of the spray assembly are selected so as to have a spray pattern similar to that illustrated with reference to nozzle 29a in FIG. 4. There should be a sufficient number of such nozzles distributed on the spray assembly in order to provide for complete coverage of the yeast layer with the water sprayed from these nozzles. During removal of the yeast layer from the vessel, it has been found that is important that the spray impinge on the yeast layer itself and that the quantity of water being sprayed be conrolled so as to prevent the build-up of a layer of water over the yeast layer since the formation of a water layer over the yeast will prevent effective removal of the yeast from the vessel. To prevent this build-up of an inhibiting water layer, it has been found that most effective yeast removal is accomplished by operating the spray nozzles intermittently in short bursts followed by a period of rest and then repeating this cycle for the length of time required to remove the yeast layer. The pressure of the water fed through the spray nozzles should be high enough to aid yeast removal and experimental data accumulated so far indicate that a pressure of about 40 p.s.i.g. or above is most effective for this purpose. After as much of the yeast as possible has been removed from the floor of the vessel, the residue that has accumulated on the top wall and side walls of the fermentation vessel is removed. To this end, the spray nozzles located on the lower branch 27 of the spray assembly are selected to have a spray pattern that is directed upwardly to impinge on the ceiling of the fermentation vessel and also sidewardly to impinge upon enough of the vessel side walls so as to cover that portion thereof at which the "Brandhefe" would normally form. (Brandhefe: "a crusty, reddish brown deposit of yeast, resins and proteins on the wall of fermentation vessels above beer level," as defined in The Practical Brewer, published by the Master Brewers Association of America, 1946.) The Brandhefe forms a ring about the vessel, with its upper boundary being the top of the foam layer developed during fermentation and its lower boundary being the top of the liquid wort level. This position is indicated by the letter "C" in FIGS. 2 and 4. The spray nozzles located on the lower branch 27 may have a spray pattern similar to that shown with reference to spray nozzle 29b in FIG. 4. For effective removal of all the yeast from the vessel, the valves 30 and 31 controlling the flow of water through the spray nozzles may be actuated to provide the following sequence: water is pumped through the spray nozzles on the upper branch (which are directed downwardly as described above) to loosen and remove the settled yeast from the vessel and, next, water is pumped through the spray nozzles on the lower branch (which are directed upwardly) to remove yeast from the floor of the vessel which could not be reached by the nozzles on the upper branch. The water from the lower nozzles will impinge on the upper sides and top of the vessel and then drain downwardly over the floor of the vessel. The downwardly directed sprays are of predominant importance in this yeast removal portion of the process. This sequence of operation provides for extremely effective yeast removal from the fermentation vessel. It is not necessary that the spray assembly consist of two branches, as in many vessels it may comprise only a single branch having appropriately positioned nozzles, but this depends primarily on the shape of the fermentation vessel. However, where a spray assembly having only one branch is utilized it is highly advantageous that some of the spray nozzles on the assembly be arranged to spray downwardly and others arranged to spray upwardly, as described above. The number, spacing and type of nozzles used will also depend largely upon the shape of the fermentation vessel. The drainage characteristics of the vessel will affect the amount of water used and its rate of flow, as well as the duration of spraying relative to the duration of an off period where intermittent spraying is used. As water is being sprayed through the nozzles 29 of the spray assembly, valves 4 and 49 are opened so that the water and yeast will drain from the vessel and flow through row transfer line 3, end pipe 75, line 48 and the liquid drain line 47. The pump 50 is actuated as necessary and valve 58 in line 54 is open while valves 56 and 57 are closed so that water and yeast can flow through line 51 into the yeast tank 55. The water can be periodically decanted from the yeast tank 55 and the yeast pumped to other processing operations for recovery and reuse as desired. The recovered yeast can be used to inoculate subsequent batches of wort and any excess can be sold as by-product or discarded.

Figure 5:
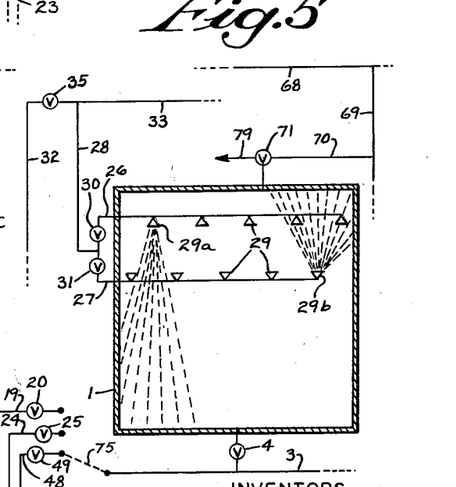

(4) After the yeast has been removed, the interior of the vessel is cleaned with cleaning solution. For this purpose, turning to FIG. 1, valve 40 at the base of the water tank is closed and valve 45 in line 44 is opened so that cleaning solution may be pumped from the cleaning tank 43 through the horizontal transfer line 46, the vertical riser 32 and thence through the spray assembly nozzles. As indicated in FIG. 5, the movable end pipe 75 remains connected to valve 49 but, referring now to FIG. 1, valves 57 and 58 are closed and valve 56 is opened. As was true with the water spray for yeast removal, the cleaning solution may be pumped through the spray nozzles 29 either intermittently in bursts or as a steady stream and, most desirably, at a pressure of at least about 40 p.s.i.g. An effective cleaning procedure is obtained by using a combination of intermittent and steady flow and by alternating between the upper and lower branches of the spray assembly. After yeast has been removed from the vessel, the main task of the cleaning solution is to remove the Brandhefe ring which forms on the upper part of the side walls and perhaps on the ceiling of the vessel. For this purpose, the nozzles on the lower branch 27 are directed so that their spray will impinge on the side and top walls of the vessel at those portions thereof where the Brandhefe ring normally forms, as described above in paragraph (3). In the illustrated example, the nozzles on the lower branch would be actuated more than those on the upper branch since the cleaning solution sprayed from these nozzles will impinge on the side and top walls of the vessel to remove the Brandhefe ring and then drain over the floor to clean the latter. As the cleaning solution drains down the walls of the vessel onto the floor, it will flow through valve 4, thence through row transfer line 3 on down the liquid drain line 47, past the pump 50 and through lines 51 and 52 into the cleaning solution tank 43. In instances where the cleaning solution drained from the tank is not suitable for reuse, valve 56 in the line 51 can be closed and valve 57 in drain extension line 53 opened so that the cleaning solution can pass directly therethrough into the drain. Many types of cleaning solutions can be used in the practice of this invention. However, the most common types of cleaning solutions are highly alkaline (normally being composed principally of sodium hydroxide or trisodium phosphate), and these types of cleaning solutions would rapidly react with carbon dioxide to form sodium carbonate when sprayed through the carbon dioxide atmosphere which is maintained in a fermenting vessel according to this invention. This type of reaction between the cleaning solution and carbon dioxide would rapidly consume the active ingredients in the cleaning solution and thereby render it ineffective for its intended purpose. Therefore, the cleaning solution should be of a type which is compatible with carbon dioxide; by "compatible" as used herein we mean that it will not appreciably react with carbon dioxide under the conditions normally encountered in the process of this invention. Thus acidic cleaning solutions such as those using phosphoric acid, and generally also including sequestering and wetting agents, are most useful for this purpose. A cleaning solution using sodium carbonate may also be useful. The acidic cleaning solutions are also most effective for this use since they prevent the accumulation of "beer stone" on the interior walls of the fermentation vessel. (Beer stone: "grayish-brown deposit of calcium oxalate and organic matter on the surface of equipment in prolonged contact with beer," as defined in the The Practical Brewer, published by the Master Brewers Association of America, 1946.) The cleaning solution must also be one that will loosen the Brandhefe from the walls of the fermenting vessel and, preferably, dissolve the beer stone, in order to effectively clean the vessel after beer and yeast have been removed. After the interior of the vessel has been thoroughly cleaned with cleaning solution to remove the Brandhefe ring and beer stone, it is rinsed with water in order to remove any cleaning solution which might have remained in the vessel. This can be accomplished merely by closing valve 45 and opening valve 40 at the base of the cleaning solution and water tanks respectively. When rinse water is pumped through in this fashion, valves 56 and 58 should be closed and valve 53 opened so that the rinse water draining from the vessel will pass through line 51 and thence through drain extension line 53 instead of passing into the cleaning solution tank and diluting the cleaning solution stored therein and also instead of passing into the yeast tank 55.

(5) After the vessel has been thoroughly cleaned in the foregoing manner, it is ready to receive another batch of wort and the steps described above in paragraphs (1) through (4) are repeated on successive batches of wort.

As a specific example of the application of this invention to a particular type of tank, experimental runs were made using a rectangular fermentation vessel that was 45 feet long, 9 feet 9 inches high and 10 feet 2 inches wide, with a capacity of about 1,000 barrels (31 gallons per barrel) of wort, and wherein the floor was pitched so that it was 6 inches higher at the back of the vessel than at the front. The vessel was fitted with a spray assembly of the type described above with reference to FIG. 1. A batch of wort was pumped into the vessel and fermented under a carbon dioxide atmosphere. The beer was removed from the vessel upon completion of fermentation and was displaced by carbon dioxide leaving behind a yeast layer that was about 1 to 2 inches high at the front of the vessel. Cold water was then sprayed through the downwardly directed nozzles located on the upper branch of the spray assembly and the spraying was accomplished in three minute cycles wherein the water was sprayed for a 10 second burst and turned off for 2 minutes, 50 seconds to allow for drainage. This type of spraying was carried out for a period of two hours, after which about 80 to 90% of the yeast was removed from the vessel. Then water was sprayed alternately through the lower branch of the spray assembly and the upper branch, each branch being actuated intermittently on the same three minute cycle. This spraying was carried on for a two hour period, after which it was found that the yeast was removed from the vessel. Next, cleaning solution was sprayed through the lower branch in a continuous manner for about one hour, after which cleaning solution was sprayed for a one-half hour period, alternating between the upper and lower branches of the spray assembly, with each branch run intermittently on the foregoing three minute cycle. A phosphoric acid type cleaning solution was used. This removed the Brandhefe ring and beer stone from the vessel. Lastly, rinse water was sprayed through the spray assembly for one-half hour alternating between the upper and lower branches of the spray assembly, with each branch actuated intermittently on the above three minute cycle. The entire cleaning operation commencing with yeast removal was carired out while a carbon dioxide atmosphere at a pressure of ½ to 1 p.s.i.g. was maintained in the vessel.

Upon completion of this cycle, it was found that the vessel was in a thoroughly clean condition and that there was no residual yeast in the vessel, the Brandhefe ring was completely removed and there was no evidence of any beer stone adhering along the interior walls of the vessel. The vessel was then ready for subsequent batches of wort and a repetition of the foregoing sequence.

From the foregoing description, it can be seen that this invention provides for maintaining a carbon dioxide atmosphere substantially devoid of oxygen in each fermenting vessel as it goes through the sequence of steps ranging from reception of yeasted wort through cleaning the vessel in preparation for the admisison of a subsequent batch of wort. This feature of the invention has a number of significant advantages which will be discussed in detail hereinafter. It is understood, of course, that each fermenting vessel undergoes the sequence of steps that was described above with reference to fermentation vessel 1. In some installations it will be possible to have each horizontal row of fermenting vessels undergoing the same step, that is, all vessels in one row may be filled with yeasted wort at the same time and carried on through the ensuing steps including cleaning at the same time. The apparatus as it has been described lends itself well to the provision of automatic controls so that the various valves may be actuated automatically according to a predetermined program for control of the various liquid streams and the carbon dioxide atmosphere.

Figure 6:
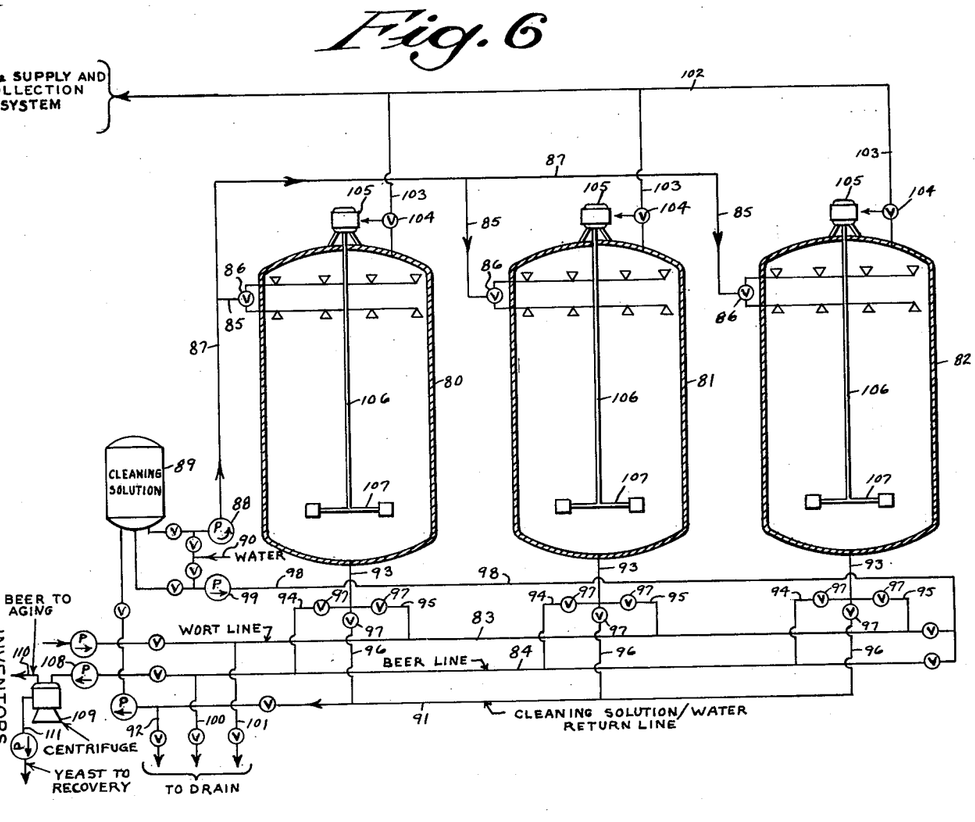
FIG. 6 is a schematic drawing of an alternate arrangement of fermenting vessels suitable for the practice of this invention.

FIG. 6 illustrates another form of the apparatus arranged for the practice of this invention wherein three enclosed cylindrical fermenting vessels 80, 81 and 82 are shown together with the necessary piping, valves and associated equipment. Each vessel may be equipped with suitable attemperating means, not shown in the drawing. A wort line 83 is provided to feed yeasted wort into each fermenting vessel and a beer line 84 is provided to receive freshly fermented beer from each vessel upon completion of fermentation of a batch of wort therein. Each vessel has a spray assembly located near its upper portion, which may be similar in construction to the spray assemblies described above with reference to FIGS. 1–5. However, the type of spray assembly is not limited to the aforementioned upward and downward directed fixed spray nozzles but other forms are useful, such as for example rotating or oscillating spray assemblies. A branch line 85 leading to a valve 86 connects each spray assembly to a liquid header 87 which in turn is connected at one of its ends to the pressure side of pump 88; the valves 86 may be three position valves to control flow of liquids through either the upper branch or the lower branch of the spray assembly separately, or both as desired. Cleaning solution from a supply tank 89 or water from a supply line 90 may be furnished to the suction end of a pump 88 thereby enabling either cleaning solution or water to be pumped through the spray assembly in each fermenting vessel. A cleaning solution/water return line 91 is provided to collect both cleaning solution and water from each fermenting vessel, with suitable valves and pumps being included so that cleaning solution can be returned to tank 89 or either water or cleaning solution can be sent to drain through drain line 92. A short pipe 93 extends from the base of each fermenting vessel and is connected through a T to branch lines 94, 95 and 96. Each branch line 94, 95 and 96 includes a valve 97 and these valves may be actuated as necessary so that, alternately, wort can be supplied into each vessel, beer can be withdrawn from each vessel and cleaning solution or water can be withdrawn from each vessel. Line 98 connects at its one end to both the wort line 83 and the beer line 84 and at its opposite end to the pressure side of pump 99. As indicated in the drawing, either cleaning solution from the cleaning solution tank 89 or water from the water supply line 90 may be supplied to the suction side of pump 99 to thereby permit either cleaning solution or water to be pumped through the wort line and beer line so that these latter two lines may be cleaned and rinsed periodically. Drain lines 100 and 101 extend from the beer line and wort line respectively so that liquids used to clean these two lines can be drained therefrom. A carbon dioxide collection and supply line 102 extends across the vessels and is connected to each vessel through a carbon dioxide branch line 103 and valve 104; the end of the line 102 indicated by the arrowhead is connected to a suitable carbon dioxide collection and/or supply system, not shown, which may be of the type described previously and which may also include a surge tank 59 as shown in FIG. 1. This system of pipes and valves is thus adapted to permit the practice of this invention wherein each vessel can be filled with wort, the wort fermented to beer, the beer withdrawn and then each vessel cleaned while at all times maintaining a carbon dioxide atmosphere in the fermenting vessel. Inasmuch as this sequence has been thoroughly described above in connection with FIGS. 1–5, a detailed description of the actuation of the various valves, etc. to provide this will not be repeated in detail at this time. Reference to FIG. 6 and to the foregoing description of FIGS. 1–5 will readily disclose to those skilled in the art the proper use of the apparatus of FIG. 6 to carry out this invention.

The most important difference between the apparatus of FIG. 6 and that shown in the other figures is that the wort may be agitated during the fermentation period in order to suspend the yeast prior to withdrawal of the beer from the fermenting vessels. To this end, a drive unit 105 is mounted at the top center of each vessel and drives a shaft 106 carrying an agitating paddle 107 on its lower end. This arrangement is designed to agitate the fermenting liquid throughout the time it is being fermented so that a yeast layer will not be permitted to settle out, at least to any significant extent. Upon completion of fermentation, the beer carrying suspended yeast is withdrawn from each fermentation vessel through the short pipe 93, branch line 94 and into the beer line 84 under the action of the pump 108. Thereafter, the beer/yeast mixture is fed into a centrifuge 109 wherein the yeast is separated from the beer. The freshly fermented beer flows from the centrifuge through line 110 into a suitable aging system, not shown. The yeast is withdrawn from the centrifuge through line 111 and may be sent on for use in inoculating subsequent batches of wort or for recovery as by-product. In this embodiment of the invention, the centrifugal separation of yeast from the wort is a highly preferred form since it allows good control over the amount of yeast separated and enables complete separation if desired.

One of the important advantages of this invention is that it may be practiced with fermentation vessels of either large or small capacity. Many existing installations incorporate a large number of rather small sized vessels and, in this instance, the apparatus of FIGS. 1–5 would probably be most advantageous since the addition of suitable agitators to each vessel in an installation involving several hundreds of fermenting vessels would probably be economically undesirable. For new installations it may be desirable to include the feature of agitating the fermenting liquid and removing the yeast therefrom by means of centrifugation after the beer has been withdrawn from the fermentation vessel. This permits the use of a relatively small number of very large size vessels. Thus it is possible that a fermenting vessel system for a brewery may incorporate as few as five fermenting vessels each having a capacity of as much as one-half to one million gallons or more. Where this type of installation is contemplated, it is believed that the apparatus shown in FIG. 6 will be most suitable principally because the time required in allowing a very large batch of wort to remain quiescent in order to permit the yeast to settle out and form a layer at the base of the vessel may be excessive. Consequently, in this latter type of installation it would be best to keep the wort agitated during the fermentation and separate the yeast from the beer outside of the fermenting vessel. Means of agitation other than that shown, such as by bubbling carbon dioxide through the fermenting liquid or by recirculation of the fermenting liquid through an external pump will be apparent to those skilled in the art.

As has been described, this invention provides for carrying out batchwise fermentation of wort into an alcoholic cereal beverage wherein a carbon dioxide atmosphere is established in a fermenting vessel and thereafter, the carbon dioxide atmosphere is maintained in the vessel as the sequence of steps including filling, fermentation, emptying and cleaning is carried out on successive batches of wort. The fermentation process of this invention possesses a number of highly significant advantages as compared to batchwise fermentation in the manner in which it is presently carried out in most breweries. Principal among these advantages is the fact that a fermenting vessel is maintained completely enclosed and has a carbon dioxide atmosphere throughout the treatment of many batches of wort, thereby preventing non-sterile air from reaching wort or beer processed in the vessel. Thus the possibility of contaminating wort with non-sterile air as the wort is being pumped into the fermenting vessel is almost completely eliminated; the likelihood of contaminating the beer as it is withdrawn from the fermenting vessel is also eliminated. Equally important, the fermented beer is protected from the deleterious effects of oxidation brought about by contact with atmospheric oxygen as it is being removed from the fermenter. Because the yeast is also covered with carbon dioxide during the time it is removed from the fermenting vessel there is a much lesser danger of biologically infecting the yeast with non-sterile air.

As is well-known to those skilled in the art, yeasted wort is aerated with sterile air just prior to fermentation in order to provide the yeast with oxygen to obtain yeast growth to a population sufficient to enable fermentation to be accomplished during a reasonable length of time. While this aeration normally takes place before the wort is introduced into the fermentation vessel, it may be desirable in some instances to aerate wort with either sterile air or oxygen after it has been introduced into the fermentation vessel. This latter type of aeration can be performed during the early stages of the fermentation cycle to provide for yeast growth and would be discontinued after the yeast population had reached a preselected level so that fermentation can proceed at the desired rate. For example, after a fermentation vessel has been filled with yeasted wort, sterile air or oxygen could be bubbled through the wort for a pre-determined time to become dissolved therein to enhance yeast growth and the supply cut off after the desired amount had been added. The amount of sterile air or oxygen added for this purpose can be measured and controlled by suitable apparatus incorporated in either the headspace of the fermentation vessel above the wort level or in the wort liquid itself. If this type of aeration is used, some of the air or oxygen introduced into the fermentation vessel will probably not be dissolved in the liquid wort but will pass through the wort into the headspace of the vessel above the wort level. This form of aeration can be practiced in conjunction with the present invention. The term "carbon dioxide atmosphere" as used herein and in the claims is defined to mean a carbon dioxide atmosphere that is substantially devoid of oxygen but not necessarily completely devoid thereof. Under this definition there may be small amounts of air or oxygen in the carbon dioxide atmosphere, and one source of such small amounts of air or oxygen in the carbon dioxide atmosphere in the fermentation vessel could be due to the use of the above-described method of aeration after the wort is introduced into the fermentation vessel. Thus the claims are not intended to exclude the possibility of admitting sterile air or oxygen to a filled fermentation vessel for the purpose of being dissolved in the wort to promote yeast growth, while at the same time maintaining a carbon dioxide atmosphere in the vessel suitable for the practice of this invention.

As a second advantage, this invention eliminates the requirement of having one or more workmen entering a fermenting vessel after one batch of wort has been fermented therein in order to clean the vessel in preparation for the next batch of wort. The elimination of this feature not only represents a considerable savings in manpower requirements, but also prevents the contamination of both the yeast and the vessel by microorganisms that may be carried into the vessel by the workmen.

Thirdly, in those installations wherein carbon dioxide is recovered during the fermentation stage, this invention leads to the recovery of substantially air free carbon dioxide immediately after the start of fermentation. Generally, where a fermenting vessel is partially filled with wort, carbon dioxide is not collected until about one to three days after fermentation has started since the carbon dioxide evolved during the early stage of the fermentation cycle is mixed with air that was contained in the headspace of the vessel. According to this invention, however, once a carbon dioxide atmosphere is established in the vessel and maintained therein, then the carbon dioxide which is evolved from the start of fermentation is free of air and may therefore be recovered instead of being discarded as was previously the case.

This invention also inhibits the formation of beer stone in the fermenting vessel since there is little opportunity for the materials left behind after the beer has been removed to dry and harden; instead, materials which would form beer stone may be removed shortly after freshly fermented beer has been withdrawn from the fermentation vessel.

From the foregoing, it can be seen that inasmuch as the fermentation process of this invention eliminates many of the possibilities for introducing contaminating organisms into the wort during the fermentation cycle, it provides a fermentation system which is highly desirable from a biological standpoint.

Within recent years there has been considerable work done on continuous fermentation processes in the brewing industry and the technical and patent literature now described several continuous fermentation techniques. However, continuous fermentation has not yet attained much commercial importance in most countries since it is a basic departure from the traditional batch fermentation and therefore cannot be immediately adapted by any given brewer without an initial development program to determine the effects of this basic process change on his product. Also, since continuous fermentation is by nature a "steady-state" operation, which cannot be stopped and started at will, and since, in order to be practical, the continuous fermentation process must remain in operation for a minimum of several weeks, it is obvious that continuous fermentation requires a seven day per week operation of not only fermentation as such, but also the associated operations of wort handling, yeast handling and the removal of beer for aging. This seven day per week operation is a very significant disadvantage from the manpower standpoint due to the necessity of week end work requiring extra shifts and extra premium pay. Further, because, as mentioned above, continuous fermentation must remain in operation for a minimum of several weeks without interruption for any purpose such as cleaning, the possibility of build-up of a microbiological infection is much more likely than in a batch of fermentation.

The sequential batch fermentation described by this invention, on the other hand, is not basically different from the traditional batch process as far as the actual fermentation of the product is concerned and therefore can be readily adopted. Also, since the present invention is still a batch process, it can be operated on the same schedule as the traditional batch fermentation with which the filling, emptying and cleaning operations normally take place on a five day per week basis. This batch nature of the present invention also allows for complete cleaning of the fermentation vessel and associated equipment after each batch of beer has been withdrawn, normally on a weekly or biweekly cycle. Of course, if the biological condition of the wort, yeast and associated equipment is sufficiently good (as would be required in the case of successful continuous fermentation), this invention could also be practiced by omitting the step of cleaning for several cycles from the normal sequence of steps described heretofore. Thus, the present invention permits the traditional batchwise fermentation and at the same time, eliminates many of the manual steps involved in such fermentation and permits the use of automatic controls, which are two of the important advantages of continuous fermentation. Therefore, the present invention enables brewers to reap some of the benefits of an automatic type of process without incurring the disadvantages of continuous fermentation.

We claim:

1. The method of fermenting wort with yeast to produce an alcoholic cereal beverage such as beer, said wort containing fermentable sugars, comprising the steps of:
    (I) establishing a carbon dioxide atmosphere in an enclosed fermentation vessel,
    (II) maintaining said carbon dioxide atmosphere in said vessel while (a) introducing a batch of wort into the vessel, (b) fermenting the fermentable sugars in the wort to produce alcoholic beverage, (c) withdrawing the alcoholic beverage from the vessel, (d) cleaning the vessel to prepare it for the reception of another batch of wort, and
    (III) thereafter repeating the sequence of processing steps under (II) on at least one other batch of wort.

2. The method of fermenting wort with yeast to produce an alcoholic cereal beverage such as beer, said wort containing fermentable sugars, comprising the steps of:
    (I) establishing a carbon dioxide atmosphere in an enclosed fermentation vessel,
    (II) maintaining said carbon dioxide atmosphere in said vessel while (a) introducing a batch of wort into the vessel, (b) fermenting the fermentable sugars in the wort to produce alcoholic beverage, (c) withdrawing the alcoholic beverage from the vessel, (d) cleaning the vessel by spraying its interior alternately with cleaning solution and water to remove materials left behind after the beverage has been withdrawn and prepare the vessel for the reception of another batch of wort, and
    (III) thereafter repeating the sequence of processing steps under (II) on at least one other batch of wort.

3. The method of fermenting wort with yeast to produce an alcoholic cereal beverage such as beer, said wort containing fermentable sugars, comprising the steps of:
    (I) establishing a carbon dioxide atmosphere in an enclosed fermentation vessel,
    (II) maintaining said carbon dioxide atmosphere in said vessel while (a) introducing a batch of wort into the vessel, (b) fermenting the fermentable sugars in the wort to produce alcoholic beverage, (c) withdrawing the alcoholic beverage from the vessel, (d) cleaning the vessel by spraying its interior with a cleaning solution that is compatible with carbon dioxide and by spraying its interior with water, and
    (III) thereafter repeating the sequence of processing steps under (II) on at least one other batch of wort.

4. The method of fermenting wort with yeast to produce an alcoholic cereal beverage such as beer, said wort containing fermentable sugars, comprising the steps of:
    (I) establishing a carbon dioxide atmosphere in an enclosed fermentation vessel,
    (II) maintaining said carbon dioxide atmosphere in said vessel while (a) introducing a batch of wort into vessel, (b) fermenting the fermentable sugars in the wort to produce alcoholic beverage, (c) settling the materials in the vessel upon completion of fermentation to form a yeast layer, (d) withdrawing the alcoholic beverage from the vessel, (e) removing the yeast layer from the vessel, (f) cleaning the vessel to prepare it for the reception of another batch of wort, and
    (III) thereafter repeating the sequence of processing steps under (II) on at least one other batch of wort.

5. The method of fermenting wort with yeast to produce an alcoholic cereal beverage such as beer, said wort containing fermentable sugars, comprising the steps of:
    (I) establishing a carbon dioxide atmosphere in an enclosed fermentation vessel,
    (II) maintaining said carbon dioxide atmosphere in said vessel while (a) introducing a batch of wort into the vessel, (b) fermenting the fermentable sugars in the wort to produce alcoholic beverage, (c) settling the materials in the vessel upon completion of fermentation to form a layer of yeast, (d) withdrawing the alcoholic beverage from the vessel, (e) hydraulically removing the yeast layer from the vessel, (f) cleaning the vessel to prepare it for the reception of another batch of wort, and
    (III) thereafter repeating the sequence of processing steps under (II) on at least one other batch of wort.

6. The method of fermenting wort with yeast to produce an alcoholic cereal beverage such as beer, said wort containing fermentable sugars, comprising the steps of:
    (I) establishing a carbon dioxide atmosphere in an enclosed fermentation vessel,
    (II) maintaining said carbon dioxide atmosphere in said vessel while (a) introducing a batch of yeasted wort into the vessel, (b) fermenting the fermentable sugars in the wort to produce alcoholic beverage, (c) agitating the wort and yeast in the vessel during fermentation, (d) withdrawing the alcoholic beverage carrying suspended yeast from the vessel, (e) cleaning the vessel to prepare it for the reception of another batch of wort, and
    (III) thereafter repeating the sequence of processing steps under (II) on at least one other batch of wort.

7. The method of fermenting wort with yeast to produce an alcoholic farinaceous beverage, said wort containing fermentable sugars, comprising the steps of:
    (I) fermenting a batch of yeasted wort in an enclosed fermentation vessel to produce alcoholic beverage and carbon dioxide,
    (II) removing said beverage from the vessel upon completion of fermentation while maintaining a carbon dioxide atmosphere in the vessel,
    (III) maintaining said carbon dioxide atmosphere in the vessel while cleaning it to remove materials left behind after the beverage has been removed,
    (IV) introducing another batch of yeasted wort into the vessel while maintaining the carbon dioxide atmosphere therein, and
    (V) repeating the foregoing steps in said vessel while maintaining the carbon dioxide atmosphere.

References Cited in the file of this patent

UNITED STATES PATENTS 2,967,107    Geiger et al. ____________ Jan. 3, 1961

FOREIGN PATENTS 872,391    Great Britain ___________ July 26, 1957

UNITED STATES PATENT OFFICE
CERTIFICATE OF CORRECTION

Patent No. 3,123,475                                  March 3, 1964

Kenneth W. Wendt et al.

It is hereby certified that error appears in the above numbered patent requiring correction and that the said Letters Patent should read as corrected below.

Column 2, line 8, for "to" read -- for --; column 6, line 54, for "below" read -- above --; column 10, line 23, for "valve 53" read -- valve 57 --; column 11, line 13, for "admisison" read -- admission --; column 14, line 45, for "described" read -- describes --; line 68, strike out "of"; column 16, line 5, before "vessel" insert -- the --.

Signed and sealed this 28th day of July 1964.

(SEAL)

Attest:

ESTON G. JOHNSON                               EDWARD J. BRENNER
Attesting Officer                                     Commissioner of Patents